United States Patent [19]

Lindner et al.

[11] Patent Number: 5,599,179
[45] Date of Patent: Feb. 4, 1997

[54] REAL-TIME COMBUSTION CONTROLLER

[75] Inventors: Jeffrey S. Lindner; W. Steve Shepard; John A. Etheridge; Ping-Rey Jang; Lawrence L. Gresham, all of Starkville, Miss.

[73] Assignee: Mississippi State University, Mississippi State, Miss.

[21] Appl. No.: 283,795

[22] Filed: Aug. 1, 1994

[51] Int. Cl.$^6$ ..................................................... F23N 5/08
[52] U.S. Cl. .................................. 431/12; 431/76; 431/79
[58] Field of Search ................................. 431/76, 79, 75, 431/12; 356/318; 436/143; 250/339

[56]                References Cited

U.S. PATENT DOCUMENTS

| | | | |
|---|---|---|---|
| 3,735,127 | 5/1973 | Astheimer | 250/43.5 R |
| 3,814,570 | 6/1974 | Guigues et al. | 431/79 X |
| 4,059,385 | 11/1977 | Gulitz et al. | 431/12 |
| 4,419,918 | 12/1983 | Dyck et al. | 250/339 |
| 4,435,149 | 3/1984 | Astheimer | 431/12 |
| 4,549,080 | 10/1985 | Baskins et al. | 250/339 X |
| 4,830,601 | 5/1989 | Dahlander et al. | 431/79 X |
| 4,891,518 | 1/1990 | Day | 250/339 |
| 4,913,647 | 4/1990 | Bonne et al. | 431/12 |
| 4,914,719 | 4/1990 | Conlon et al. | 250/339 |
| 4,990,780 | 2/1991 | Lee et al. | 250/339 |
| 5,021,662 | 6/1991 | Johnson | 250/339 |
| 5,112,215 | 5/1992 | Frish et al. | 431/76 |
| 5,112,217 | 5/1992 | Ripka et al. | 431/12 |
| 5,138,163 | 8/1992 | Butler et al. | 250/339 |
| 5,206,176 | 4/1993 | Beer et al. | 436/140 |

FOREIGN PATENT DOCUMENTS

| | | | |
|---|---|---|---|
| 2035552 | 6/1980 | United Kingdom | 431/76 |
| 2204428 | 11/1988 | United Kingdom | 431/12 |

OTHER PUBLICATIONS

Journal of the Institute of Fuel, pp. 59–65, Sep. 9, 1975, "Fuel: air ratio control using infr-red spectroscopy", Smith et al.

*Primary Examiner*—Carl D. Price
*Attorney, Agent, or Firm*—Oblon, Spivak, McClelland, Maier & Neustadt, P.C.

[57]                ABSTRACT

A method and system of regulating the air to fuel ratio supplied to a burner to maximize the combustion efficiency. Optical means are provided in close proximity to the burner for directing a beam of radiation from hot gases produced by the burner to a plurality of detectors. Detectors are provided for sensing the concentration of, inter alia, CO, $CO_2$, and $H_2O$. The differences between the ratios of CO to $CO_2$ and $H_2O$ to CO are compared with a known control curve based on those ratios for air to fuel ratios ranging from 0.85 to 1.30. The fuel flow is adjusted until the difference between the ratios of CO to $CO_2$ and $H_2O$ to CO fall on a desired set point on the control curve.

2 Claims, 17 Drawing Sheets

REAL-TIME COMBUSTION CONTROLLER

This invention was made with U.S. Government support under Contract No. DE-FG02-93CH10575 awarded by the Department of Energy. The U.S. Government may have certain rights in this invention.

BACKGROUND OF THE INVENTION

1. Field of the Invention

This invention pertains to a system and method for maximizing the combustion efficiency of a burner supplied with fuel and air while minimizing the production of noxious by-products. More specifically, the invention involves the use of sensors adapted to detect infrared emissions from molecules such as $CO_2$, $H_2O$, $CO$, and $HCl$ which may be present in the elevated temperature of the exhaust gas stream downstream but in close proximity to the burner. The information obtained from the sensors is relayed to a computer (microprocessor). The computer calculates various ratios of the detected constituents which it compares with information stored therein concerning how those ratios vary with respect to the air-fuel ratio fed to the burner. Depending upon the relationship between the sensed information and the stored information, the microprocessor provides an output directing a process controller to increase, decrease, or make no change in the ratio of fuel to air supplied to the burner.

The invention is useful for electric power plants (natural gas or coal fired) hazardous waste incinerators, various kilns and municipal waste incinerators. In many cases problems exist with changes in the fuel composition and with accurate fuel delivery (e.g., coal, municipal waste). Use of the invention with internal combustion engines is also contemplated.

2. Background of the Prior Art

Several issued patents discuss infrared absorption measurements on combustion (or other) products. Those measurements involve the use of an infrared source module and the gases to be analyzed pass between the infrared source (ceramic glow-bar) and a suitable detector. The present invention measure the radiation emitted by a molecule as it undergoes a transition from a higher to a lower quantum vibrational-rotational level. Thus, the present invention involves a passive measurement which requires that the molecules of the products of combustion to be detected (such as $H_2O$, $CO_2$, and $CO$) be present at an elevated temperature in the exhaust gas eminating from the burner and act as their own source of emitted radiation.

The following documents, contrary to the present invention, all employ an absorption configuration to detect and measure various components of a gas stream: Astheimer (U.S. Pat. No. 3,735,127); Baskins et al. (U.S. Pat. No. 4,549,080); Day (U.S. Pat. No. 4,891,518); Conlon et al. (U.S. Pat. No. 4,914,719); Lee et al. (U.S. Pat. No. 4,990,780); Johnson et al. (U.S. Pat. No. 5,021,662); Butler et al. (U.S. Pat. No. 5,138,163); and Coe et al. (U.K. patent document 2,035,552). When using an absorption configuration, an infrared source is required and in some cases it is also necessary to extract a gas sample from the combustion gas stream. Moreover, an absorption measurement is only useful if the infrared source temperature is considerably higher than the gas stream.

The patent to Gulitz et al. (U.S. Pat. No. 4,059,385) discloses a device which measures the flame temperature and uses that temperature as a basis for adjusting the air fuel ratio for the combustion of oil or natural gas. In Gulitz et al., unlike the present invention which provides sensors for measuring molecular emissions, the sensors are used to measure background radiation.

Spahr (U.S. Pat. No. 4,419,918) is directed to control of the air flow to a burner on the basis of $CO_2$ measurements using some type of probe in the exhaust stack. The details of the probe are not set forth in the patent. Test results conducted by the inventors of the present invention do not indicate that $CO_2$ monotonically changes over the full range of air to fuel or stoichiometry values. Accordingly, $CO_2$ measurements would be of limited value as a parameter for adjusting the ratio of air to fuel supplied to a burner. In addition, placement of the probe in the exhaust stack results in an undesirable time lag between the combustion event which produced the $CO_2$ combustion product detected by the probe and the subsequent adjustment of the air to fuel ratio.

Frish et al. (U.S. Pat. No. 5,112,215) describe a process which attempts to quantify the emitted radiation arising from entrained high temperature particles. Particle temperatures are determined based on the Planck function and numerous simplifying assumptions. Particles must be present for these measurements, the method apparently is not applicable to natural gas, oil fired, and hazardous waste fired combustion.

Beér et al. (U.S. Pat. No. 5,206,176) describes a process which involves laser induced fluorescence measurements on polycyclic aromatic compounds. The emissions produced by fluorescence are weak and difficult to detect. In addition, the measurements taken in the Beér et al. process are done in the visible portion of the electromagnetic spectrum. The patent does not discuss the adverse effect particle scattering will have on the process disclosed therein when using a fuel such as coal.

Bonne et al. (U.S. Pat. No. 4,913,647) describe a process involving the use of emissions from, in most cases, reactive radical intermediates in the transformation of fuel to $CO_2$, $H_2O$, $CO$, etc. Unlike the present invention, those measurements are taken in the ultraviolet and visible portion of the electromagnetic spectrum where particle interference must be large—especially for a pulverized coal combustion. The emitted radiation is not modulated or chopped by a mechanical device in the process disclosed by Bonne et al. and thus flame flicker will be present. That flicker will cause a low frequency modulation to be observed in the signal produced by the sensing device. The accuracy of the four element silicon detector located adjacent the base of the flame would likely be adversely affected by soot collecting on the window of the detector. A decrease in intensity of one of the measured constituents of the combustion process due to soot particles on the window of the detector may not be the same as for another measured constituents. In this respect, we note that the scattering of light scales as $X/2$, thus a 1 μm particle will attenuate or scatter more light at 195 nm (CO) than at 432 nm (CH).

Clark et al. patent (U.S. Pat. No. 5,112,217) and the publication (Smith, A.; Sutherbank, J.; Taylor, D. S.; "Fuel: Air Ratio Control Using Infrared Spectroscopy," Inst. Fuel p. 59 June (1975) both involve a curve of infrared emission intensity against stoichiometry values ($\phi$). The curve resembles a parabola with two, non-unique, values of $\phi$ possible for 1 value of infrared emission intensity. In the present invention there is a unique value of infrared emission intensity for each stoichiometry value.

SUMMARY OF THE INVENTION

It is an object of the present invention to use a passive measurement—the radiation emitted from the molecules themselves, to determine the concentration of the combustion products under consideration in a high temperature exhaust gas stream.

It is a further object of the present invention to perform the measurement downstream of the flame but in close proximity to the flame so that the intensity of the emissions is at a high level and there is no significant time lag between combustion of the fuel air mixture and measurement of the concentration of the products of combustion under consideration. Thus, it is an object of the invention to eliminate the time lag inherent in those processes where the detector is located in the stack a considerable distance downstream from the flame.

Another object of the present invention is achieved by employing wavelengths for species detection which are in the infrared portion of the electromagnetic spectrum and are close in spectral space—i.e., they should all be affected similarly.

It is another object of the present invention to provide a more universal approach to stoichiometric control than has heretofore been possible. The present invention may be employed with waste fuel containing chlorinated species in a straightforward manner by incorporating a detector/filter combination for a given species—e.g., HCl.

Many facilities employ staged combustion so that the stoichiometric measurement at the stack is a measurement of the overall plant stoichiometry. Where the detector is located in the stack, no means is available for monitoring the efficiency of the primary burner where the stoichiometry value ($\phi$ or Phi) is typically less than one. In such cases, great quantities of energy can be wasted and undesirable products produced by the inefficient burner. An advantage of the present invention is that each stage of a multi-stage combustion process can be monitored and the air fuel mixture supplied to each burner adjusted for maximum efficiency.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
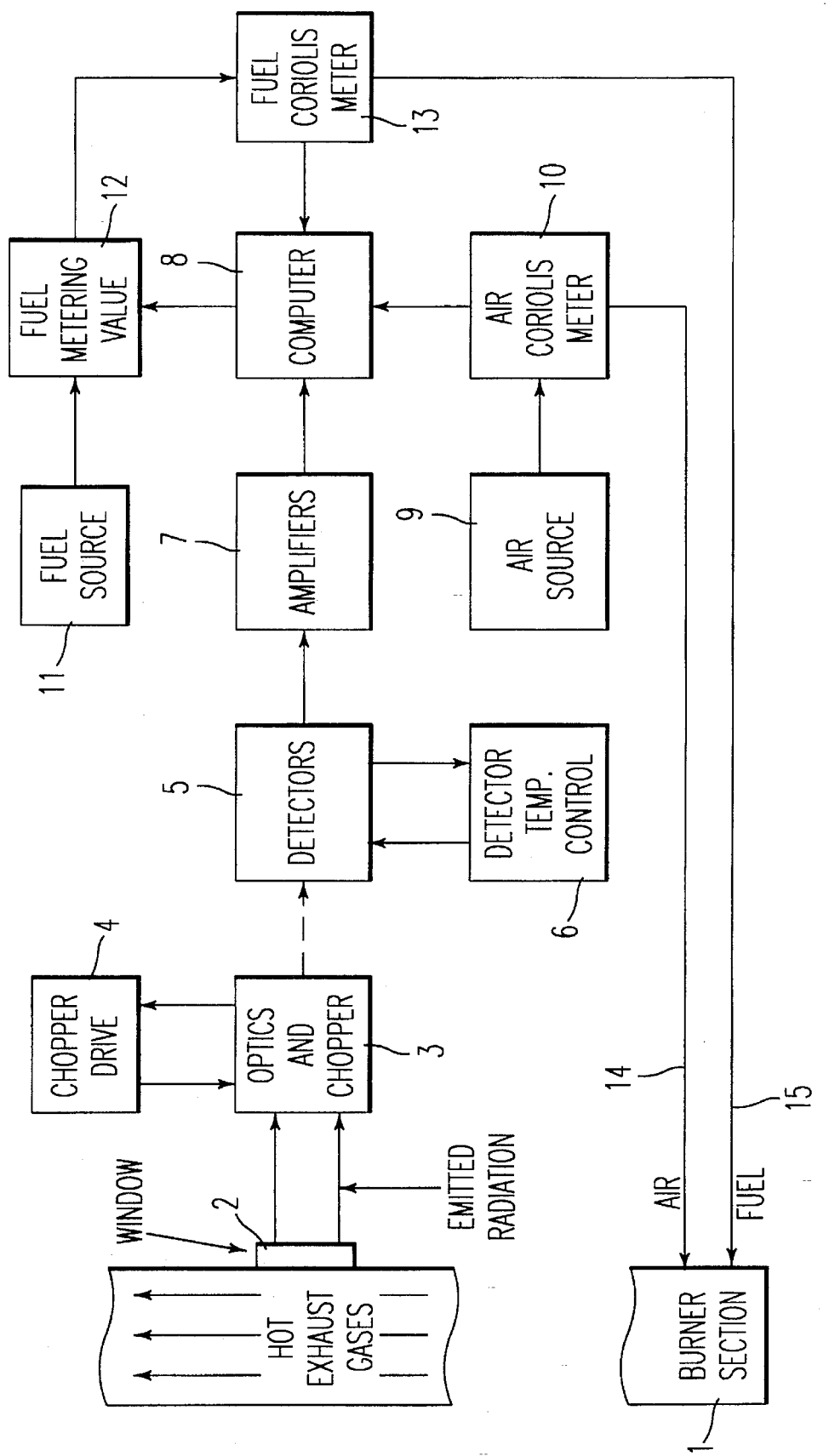
FIG. 1 is a block diagram of the real-time combustion controller device of the present invention.

Referring now to the drawings, wherein like reference numerals designate identical or corresponding parts throughout the several views, and more particularly to FIG. 1 wherein the components of the real-time combustion controller of the present invention are illustrated in a block diagram. The burner section is illustrated at 1. A window 2 is provided in the burner section a short distance downstream from the flame. Radiation emitted from the hot exhaust gases passes through the window into the optics and chopper section 3.

The chopper intermittently interrupts the passage of the beam entering the optics and chopper section. The chopper drive is illustrated at 4. The chopped and focused radiation then passes to the detectors provided in section 5. A heat exchanger 6 is associated with a detector for temperature control. The signals from the detectors are transferred to the amplifiers 7.

The amplified signals from the detectors are then transferred to the computer (microprocessor) 8. Either the flow of air from the air source 9 is monitored by the computer which measures the output C of the air Coriolis meter 10 or the flow of fuel from the fuel source 11 is controlled by the computer which controls the operation of the fuel Coriolis meter 13. Fuel flowing from the fuel source 11 to the fuel Coriolis meter 13 passes through the fuel metering valve 12 which is also controlled by the computer 8. Air is directed to the burner section through line 14 and fuel is directed to the burner section through line 15.

Figure 2:
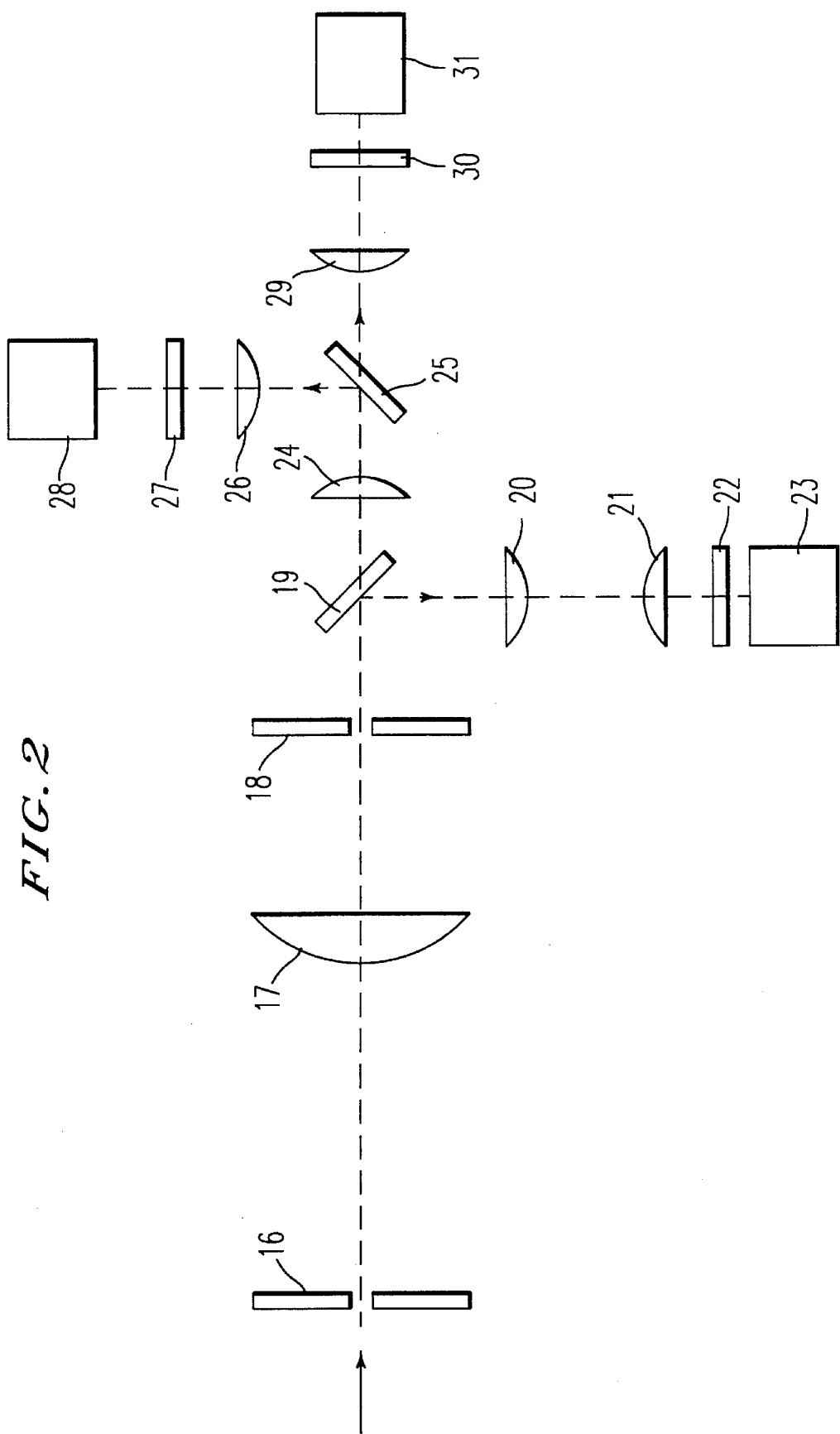
FIG. 2 is a schematic view of the optical sensor of the present invention.
Figures 3A, 3B:
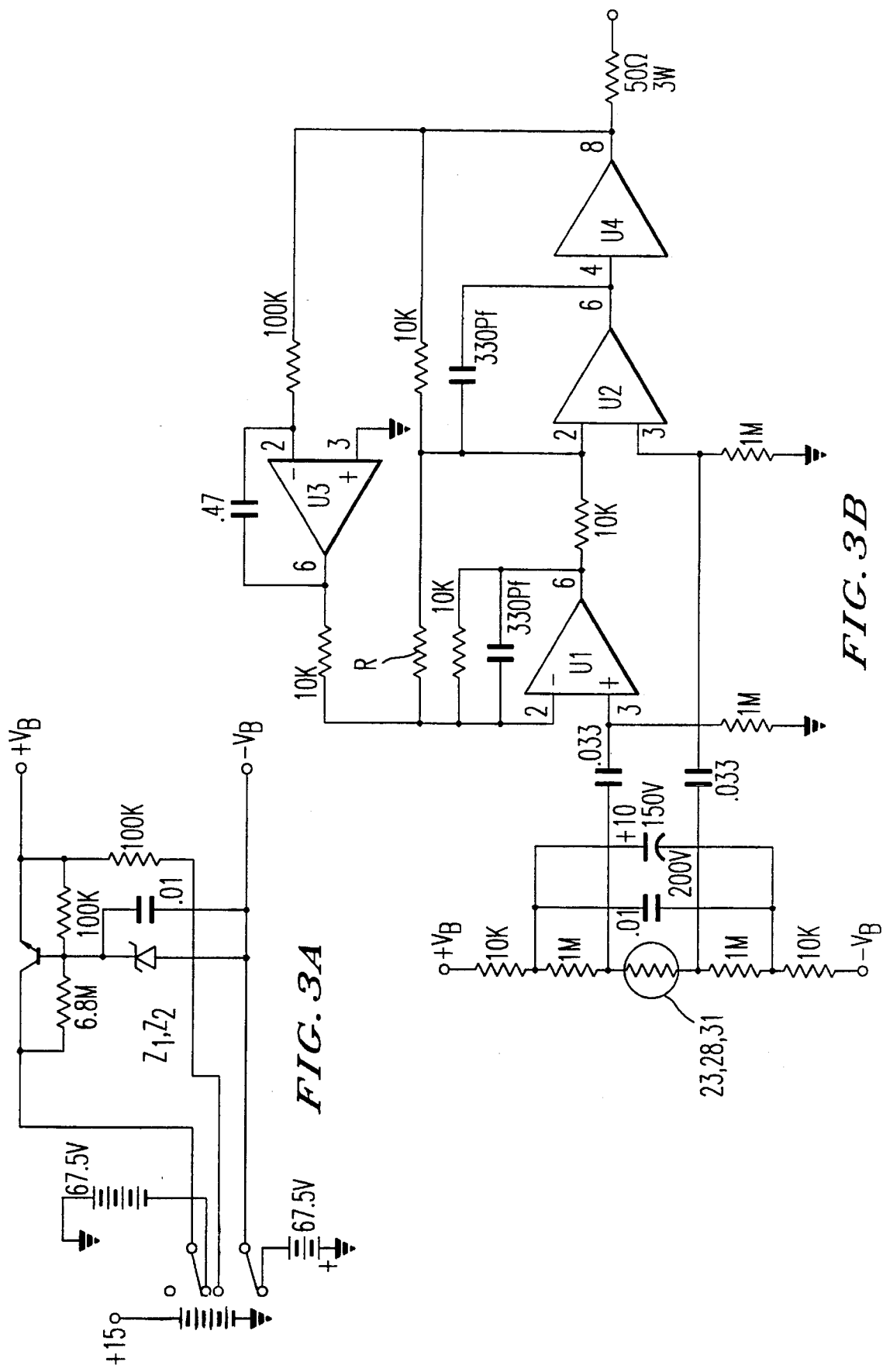
FIG. 3 is a schematic drawing of an electrical circuit for amplifying the signals obtained from the optical sensor.
Figure 3E:
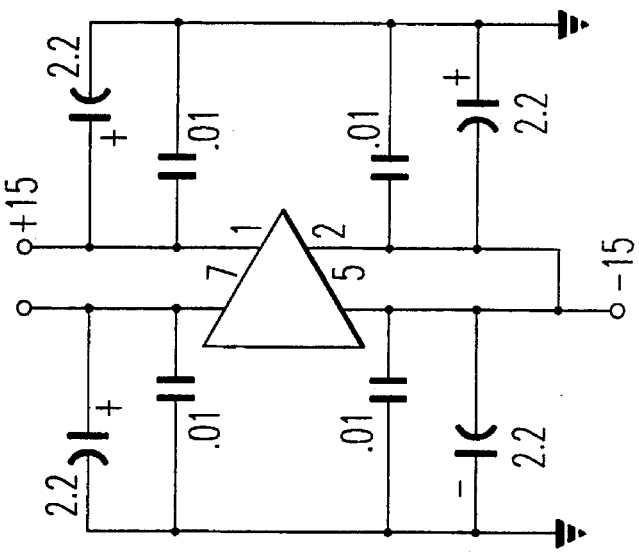
Figure 3C:
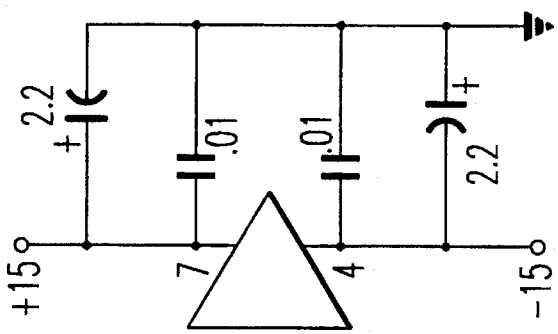
Figure 3D:
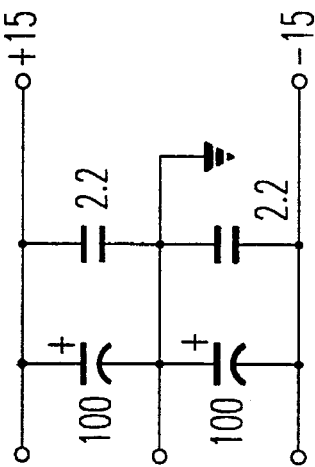

The optics, chopper, and detectors are schematically illustrated in FIG. 2. The emitted radiation passes through the aperture 16, lens 7, and chopper 18 to a beam splitter mirror 19. The mirror 19 directs a portion of the beam through the lenses 20 and 21 and bandpass filter 22 which is centered at a wavelength of 2690 nm with a full width at half height (FWHH) of 50 nm. This region of the spectrum contains emission distributions from both $H_2O$ and $CO_2$ in the ratio of approximately 9 to 1. The filtered radiation is then received by the $H_2O$ detector 23. The portion of the beam that passes through the beam splitter mirror 19 continues through lens 24 to a second beam splitter mirror 25. A portion of that beam is directed towards the lens 26 and bandpass filter 27 which passes radiation having wavelengths in the range of from 4720 nm to 5100 nm. The radiation in this portion of the spectrum relates to the CO P rotational branch. The radiation passing through the filter 27 is received by the CO detector 28. The remaining portion of the beam passes through the beam splitter mirror 25 and through lens 29 to bandpass filter 30 which has a band center located at a wavelength of 4381 nm with a FWHH of 180 nm. The radiation in this area of the spectrum corresponds to the $CO_2$ red spike.

The amplifier circuitry is schematically illustrated in FIG. 3. The amplifier is a two operational amplifier instrumentation amplifier which accepts a balanced output for a high common mode rejection ratio. Operational amplifiers $u_1$, and $u_2$ have high input impedance so they will not load the detection cell. Gain adjustment is provided by a single resistor R to match the various detector outputs to the computer input requirements. The gain is equal $2+2\times10,000/R$. Operational amplifier $u_4$ is a unity gain buffer with sufficient output to drive a 50 ohm coaxial line and operational amplifier $u_3$ provides servo control to eliminaate DC offset at the output of $u_4$. The input to the amplifier circuit is provided from one of the detectors 23, 28, or 31. A suitable detector for detecting CO and $CO_2$ is Textron model PbSe #OTC-125-21TP and a suitable detector for detecting $H_2O$ is Textron model PbS #OTC-218-81T. Zener diode $Z_1$ (IN5270B) is used with the PbSe detector and Zener diode $Z_2$ (IN5271B) is used with the Pbs detector. The sensor can easily be reconfigured to add a fourth element for HCl detection either by rearranging the optics or by system development using a quad detector. FIG. 3 also illustrates suitable circuits for decoupling operational amplifiers $u_1-u_3$, operational amplifier $u_4$, and the external power supply.

Figure 15:
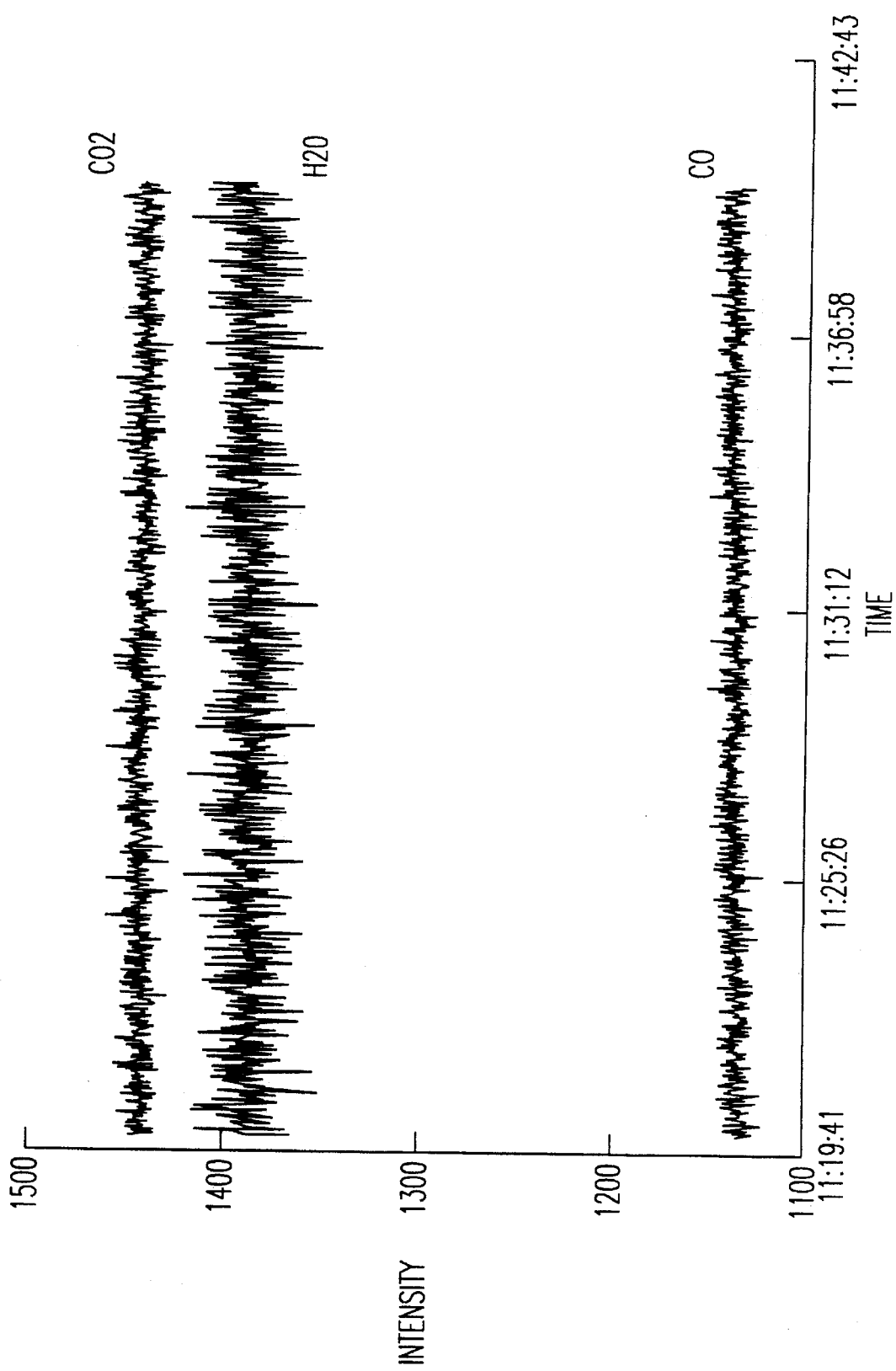
FIG. 15 illustrates the variation in intensities of the molecules of $CO_2$, $H_2O$, and CO with respect to time at constant temperature.
Figure 16:
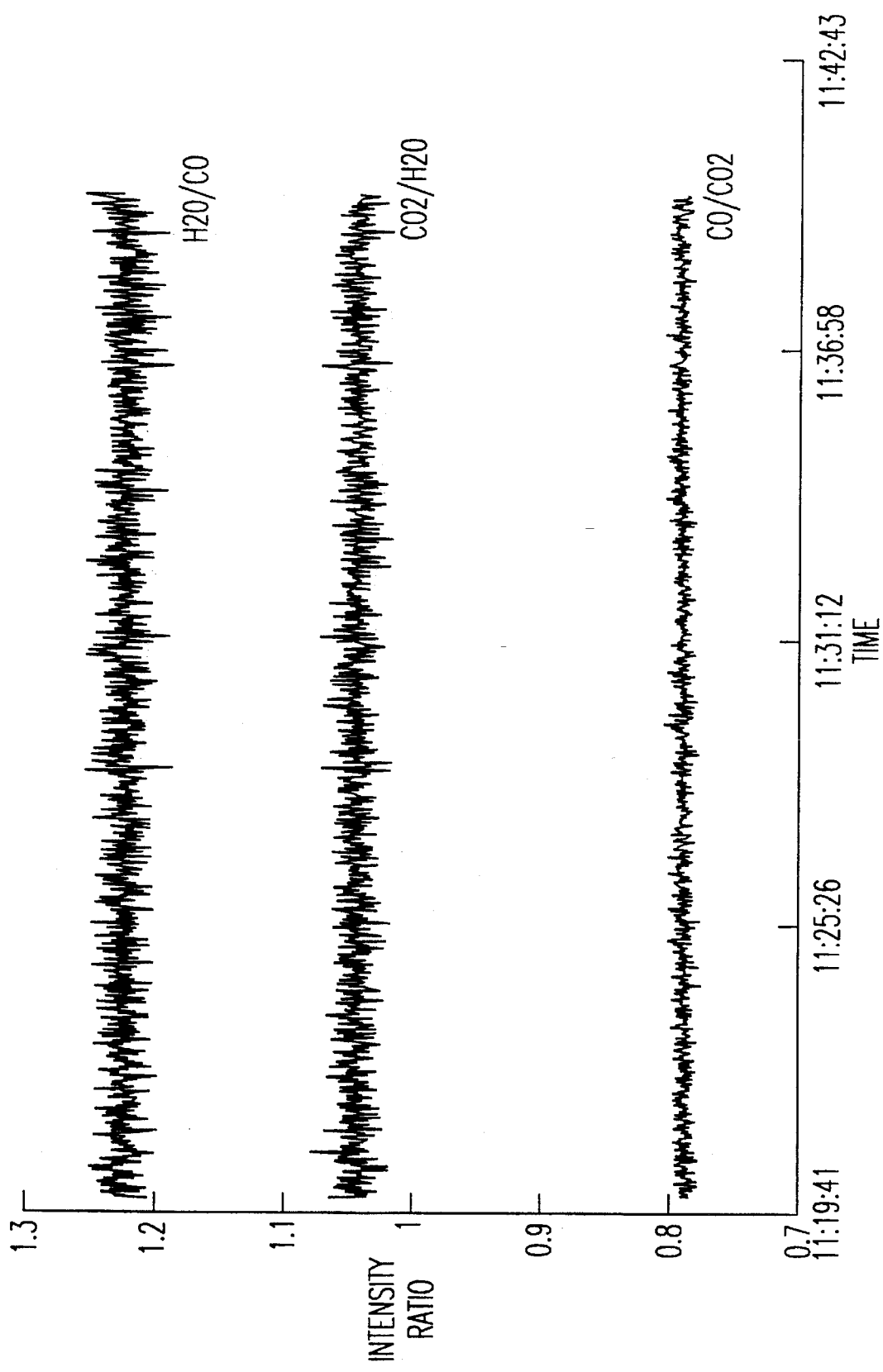
FIG. 16 illustrates the intensity ratios with respect to time of $H_2O/CO$, $CO_2/H_2O$, and $CO/CO_2$ based on the data shown in FIG. 15.

The amplifiers are of a low noise instrument configuration with adjustable gains from 2 to 1,000. Typical noise levels when the detectors of the real-time combustion controller unit are placed in direct line with a black body source are illustrated in FIG. 15. The errors range from around 0.4% for the PbSe detectors to 0.9% for the PbS detector element. Taking the appropriate ratios as illustrated in FIG. 16, laboratory-based errors range from 0.6 to 1.2%.

Figure 4:
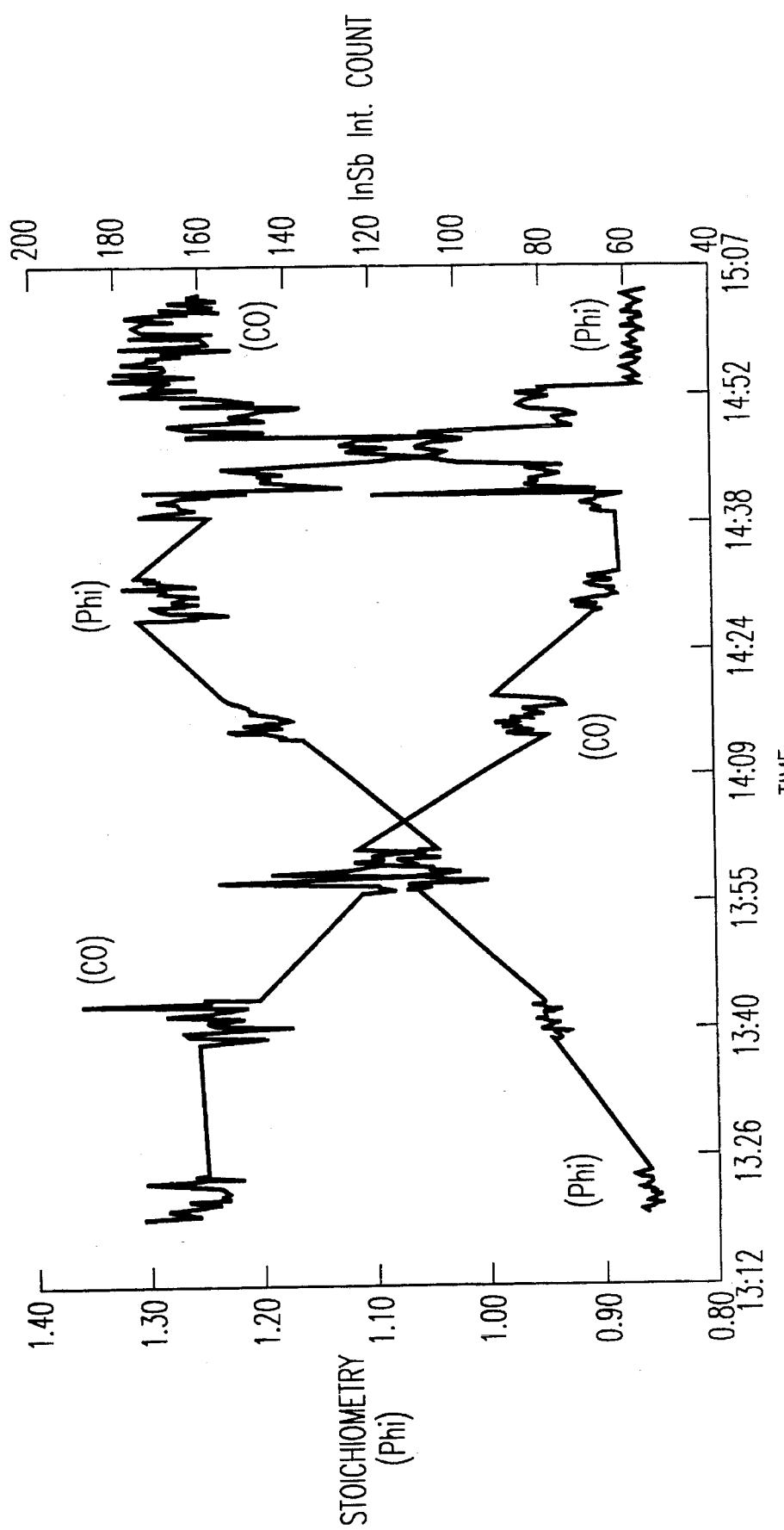
FIG. 4 illustrates how the concentration of CO in the combustion products decreases as the air to fuel ratio increases.

FIG. 4 illustrates the general decrease in CO concentration in the gas stream as the stoichiometry value (i.e., actual air to fuel ratio with respect to a stoichiometric air to fuel ratio) increases from 0.85 to 1.30 and the subsequent general increase in CO as the stoichiometry value decreases from 1.30 to 0.85.

Figure 5:
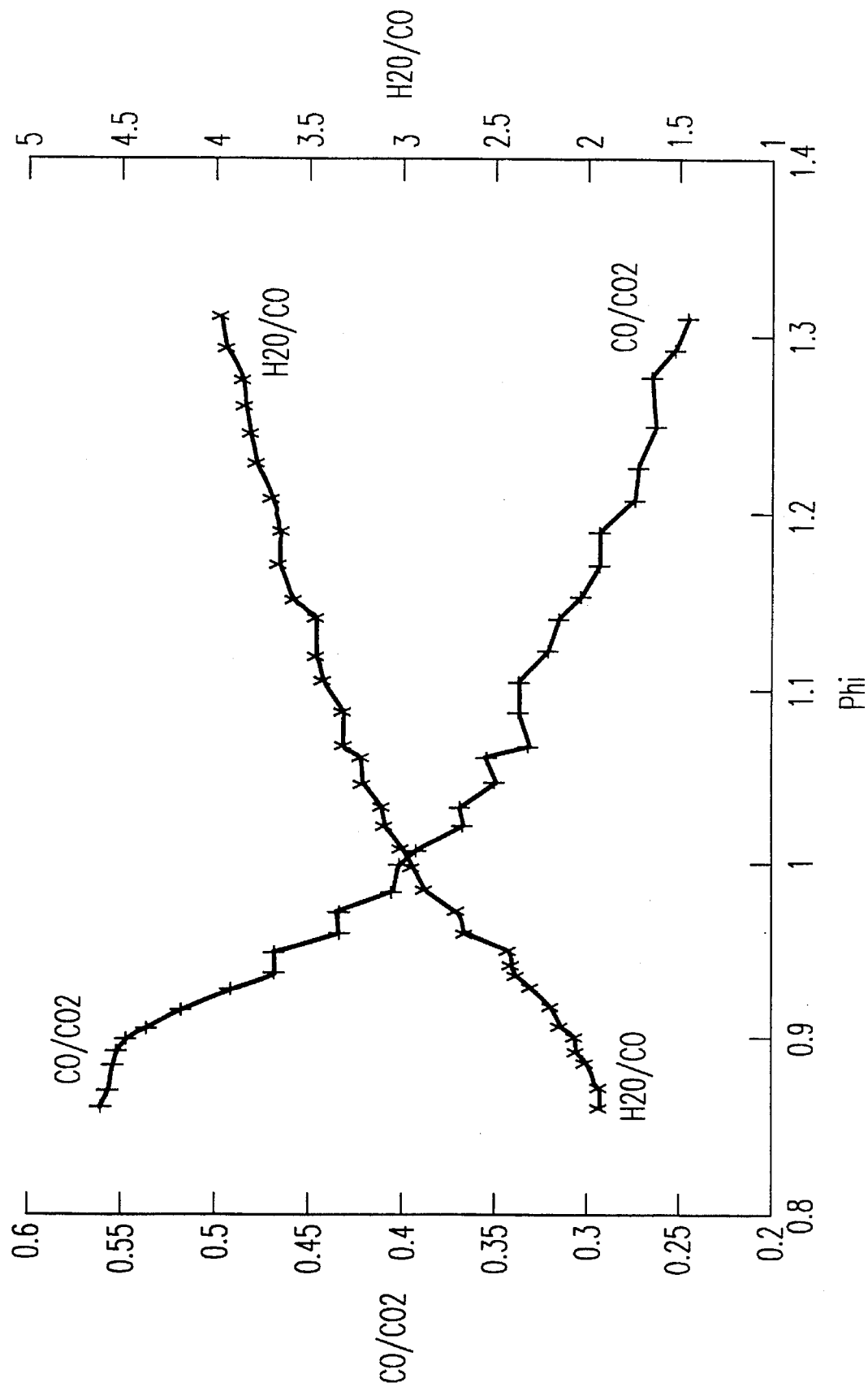
FIG. 5 illustrates how the ratio $CO/CO_2$ and the ratio $H_2O/CO$ change as the stoichiometry value (Phi) changes.
Figure 6:
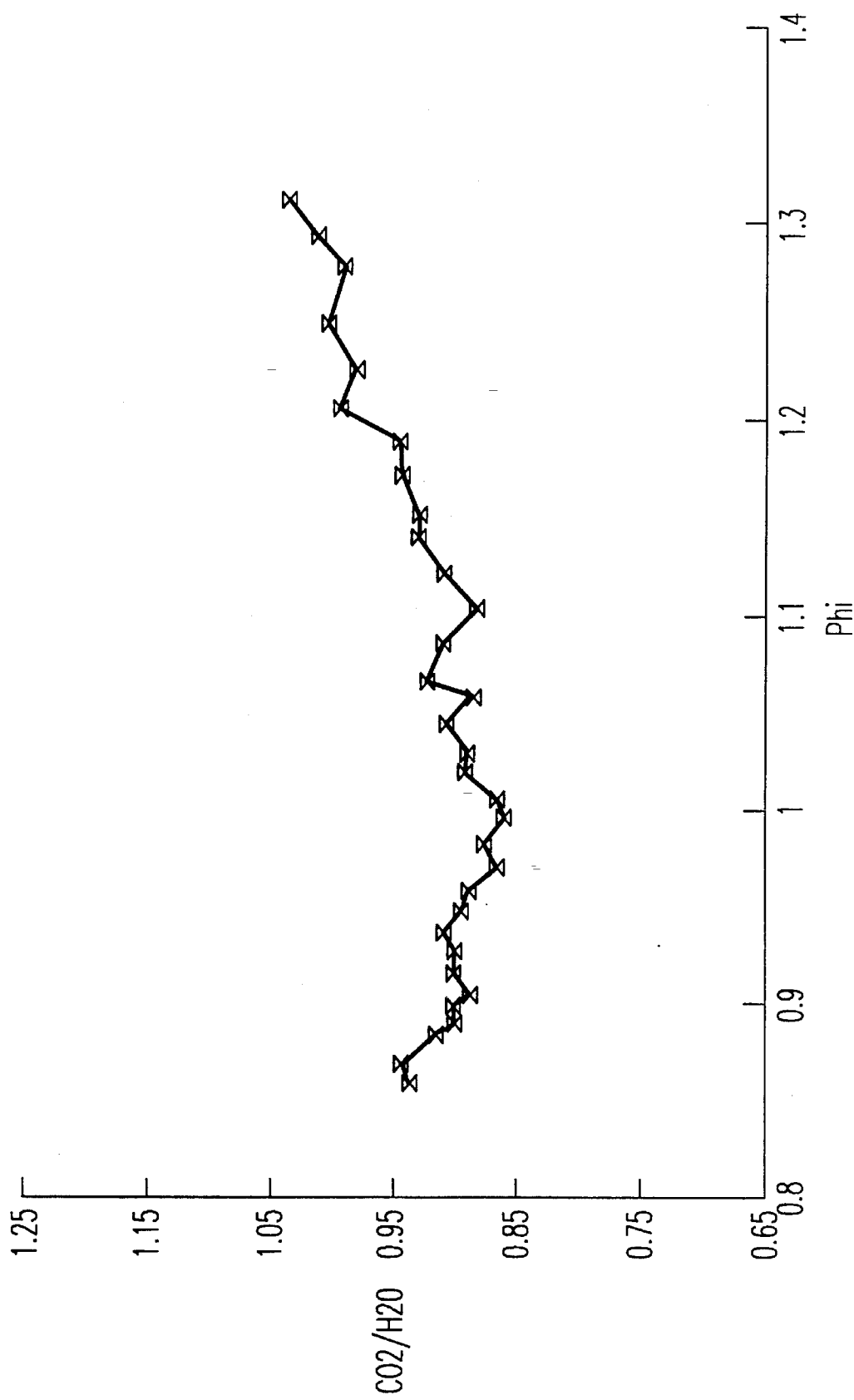
FIG. 6 illustrates that the ratio $CO_2/H_2O$ remains substantially stable as the stoichiometry value changes from a fuel rich mixture to a fuel lean mixture.
Figure 7:
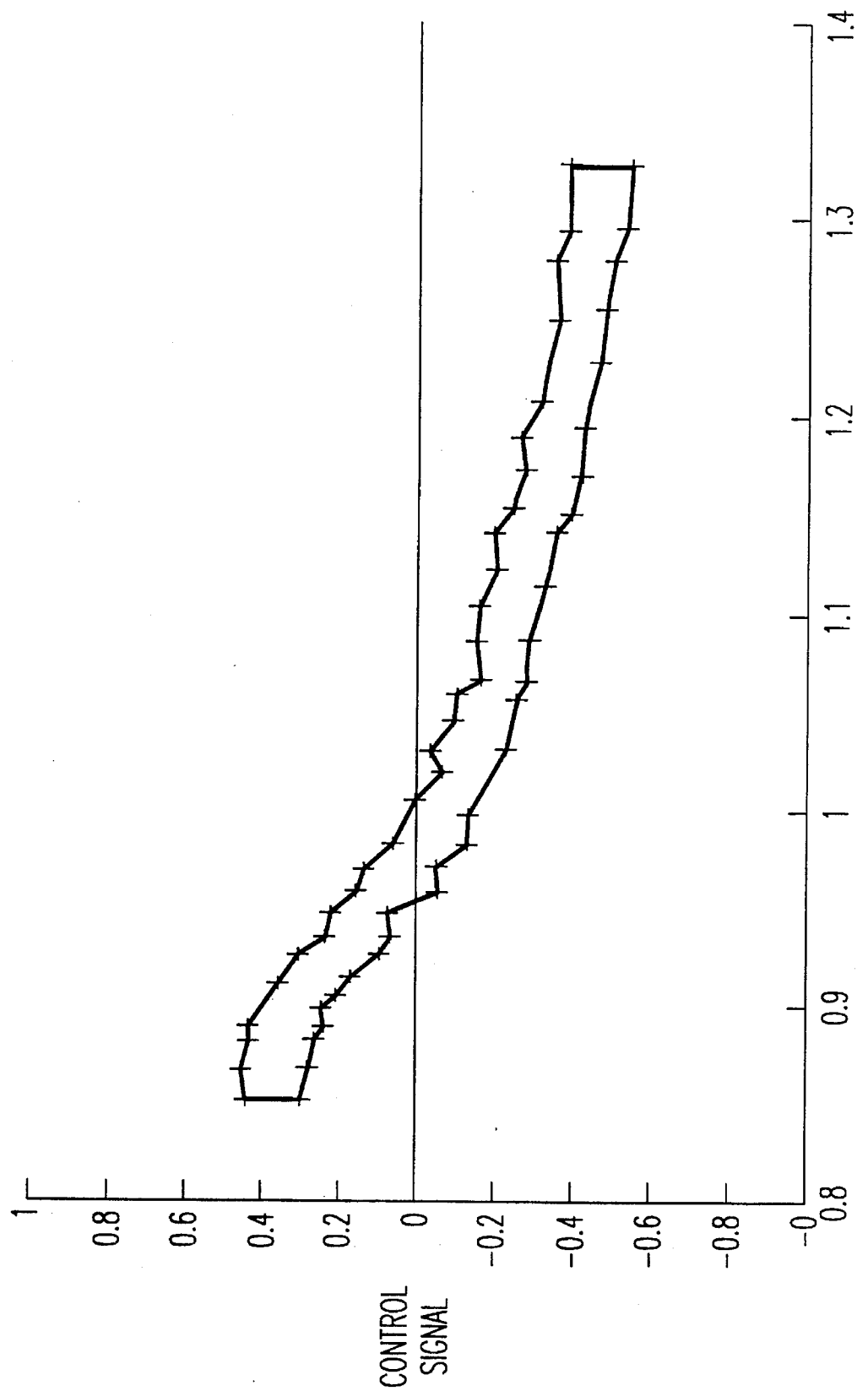
FIG. 7 is an illustration of a control curve useful with the present invention.
Figure 8:
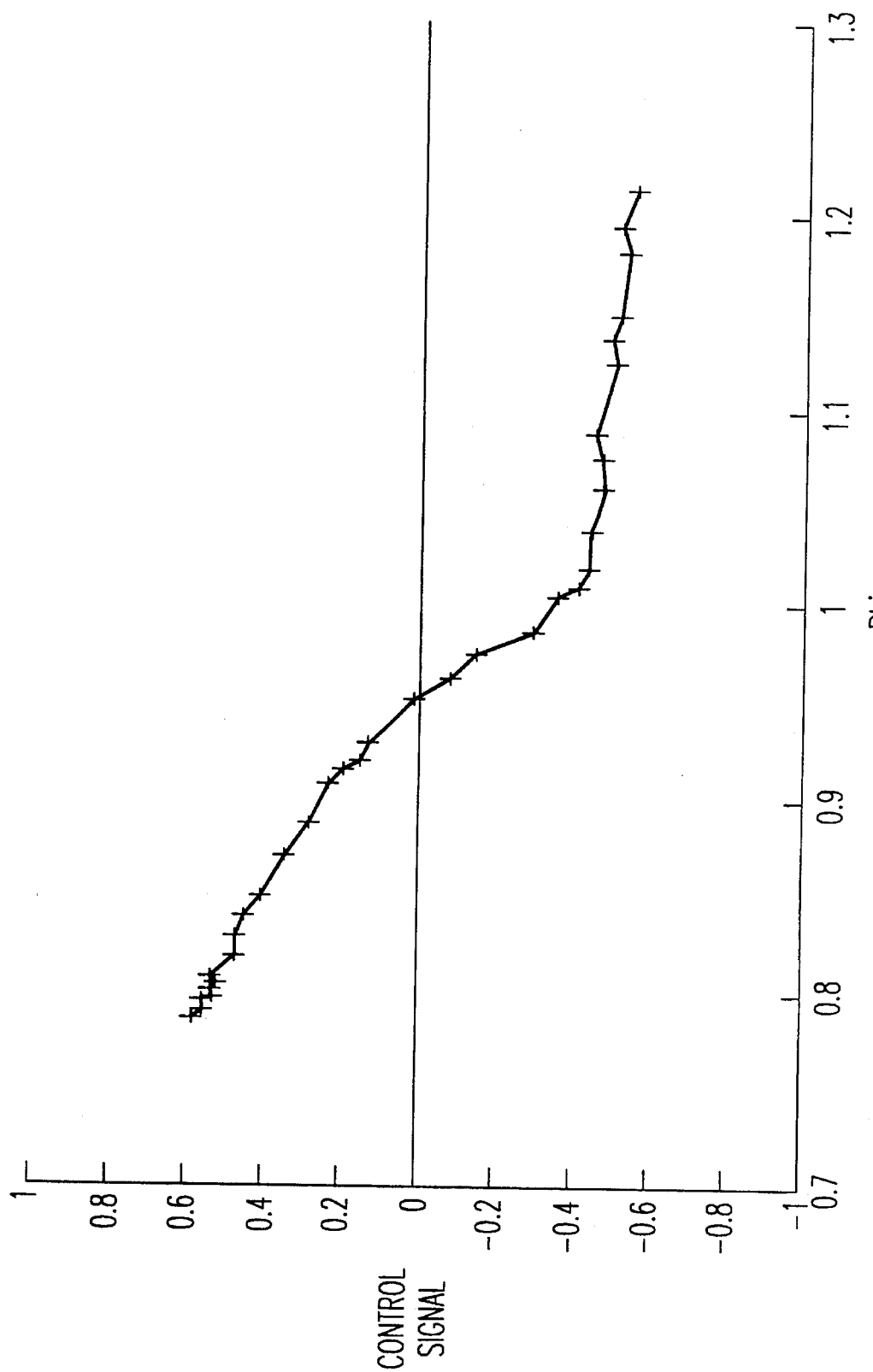
FIGS. 8 and 9 illustrate additional control curves useful with the present invention.
Figure 9:
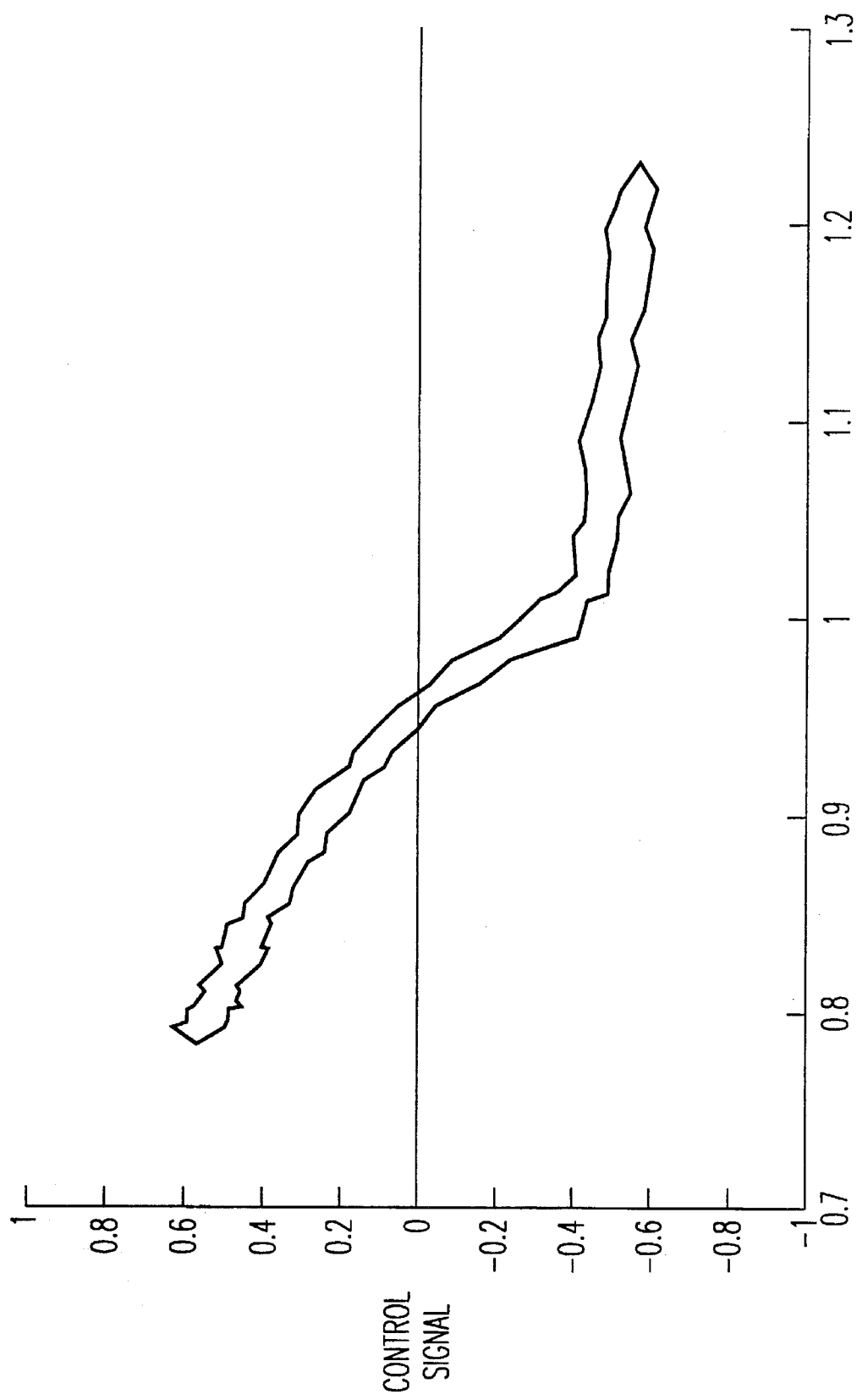
Figure 10:
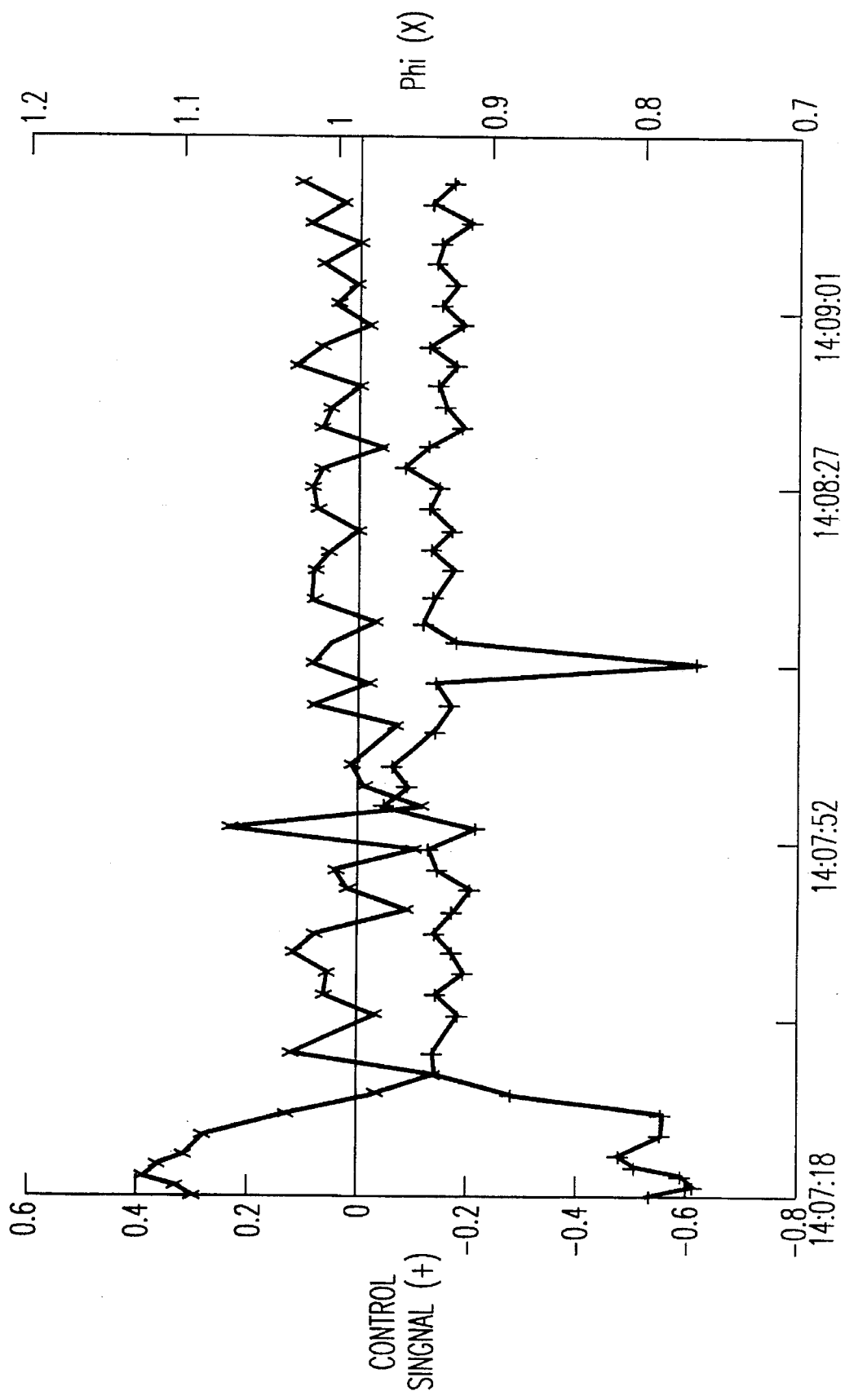
FIGS. 10–14 illustrate how the controller of the invention rapidly adjusts the air-fuel ratio to the selected set point where the ratio is maintained except for minor fluctuations around the long-time average value due to variations in the air and fuel flows to the combuster.
Figure 11:
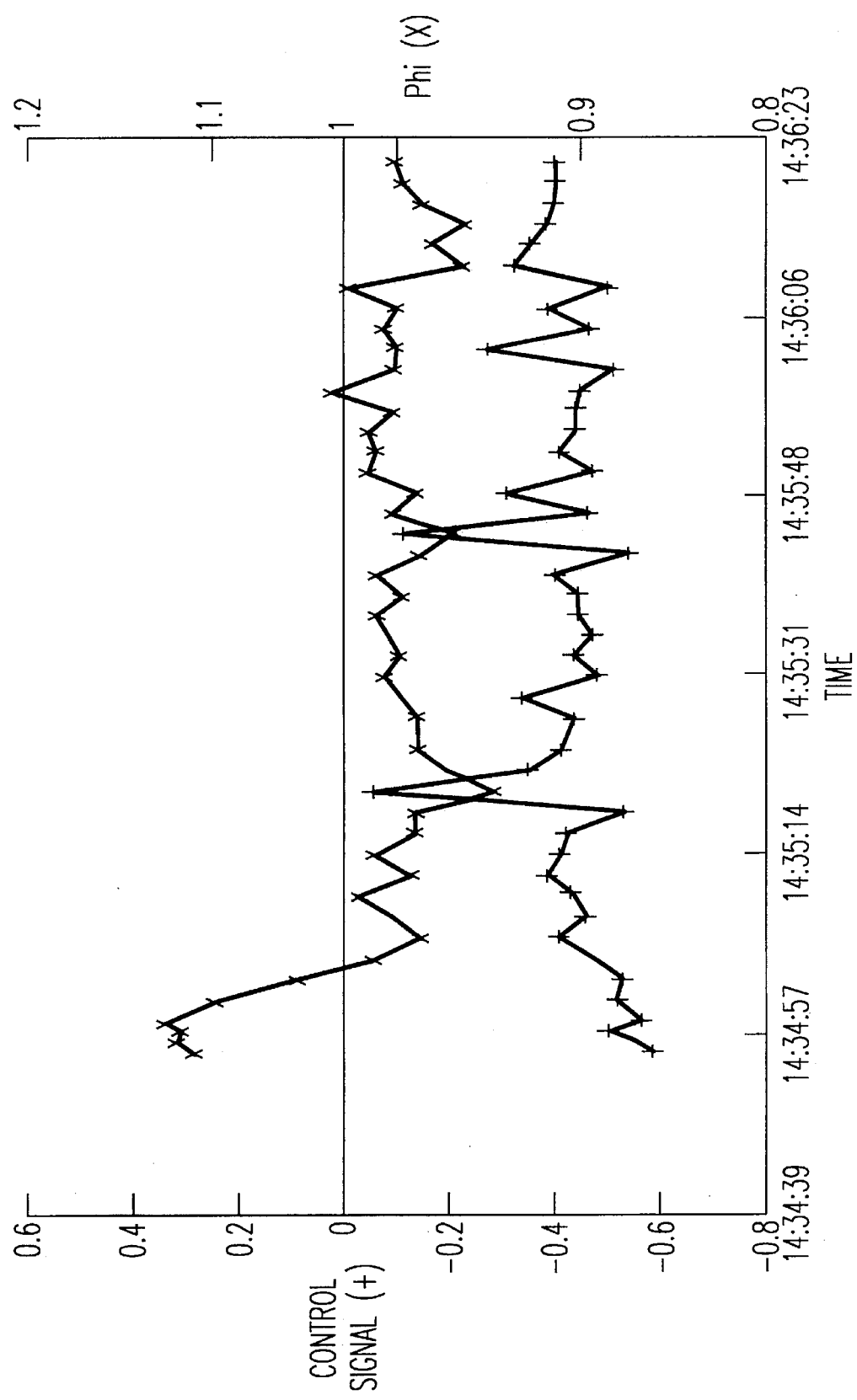
Figure 12:
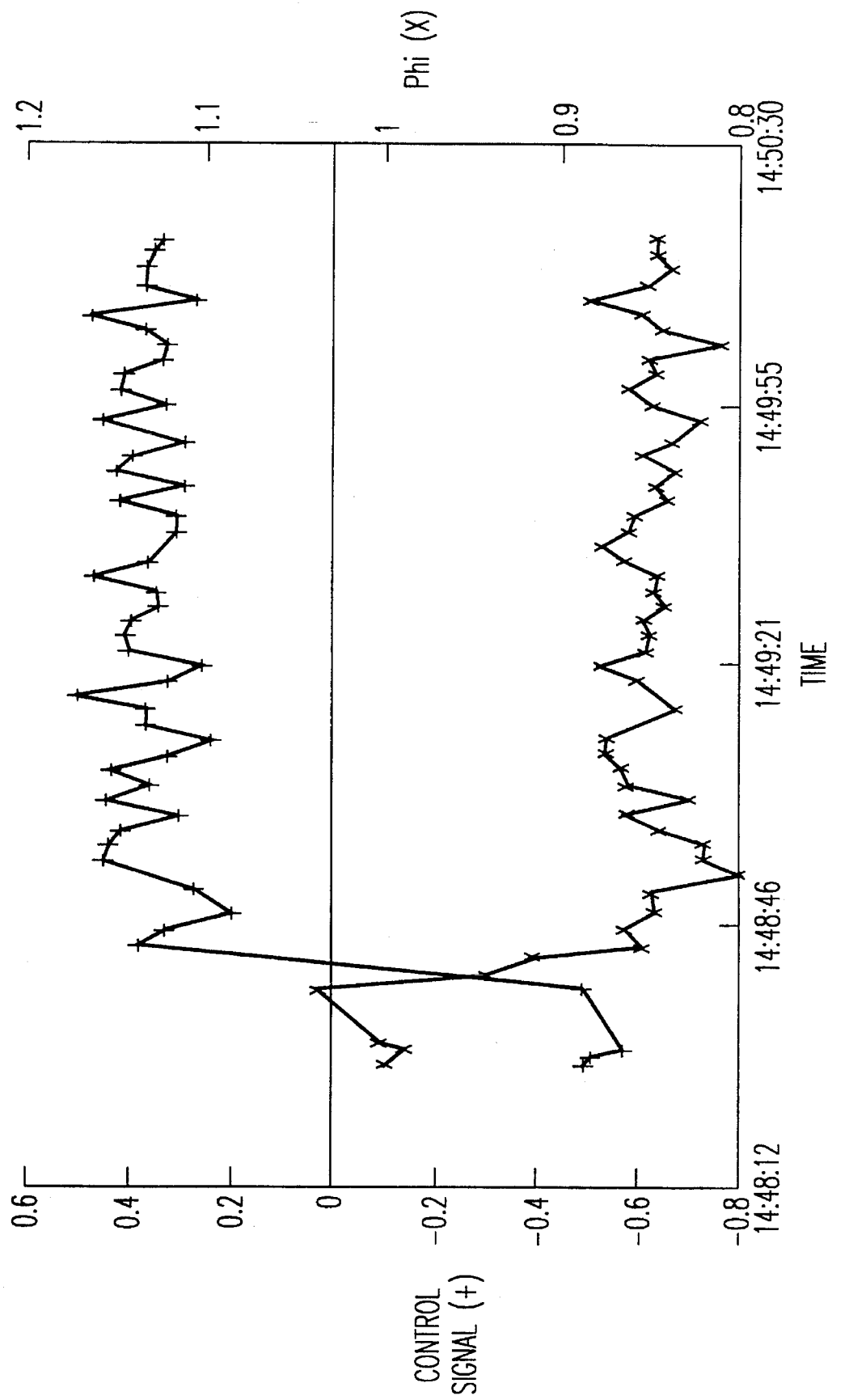
Figure 13:
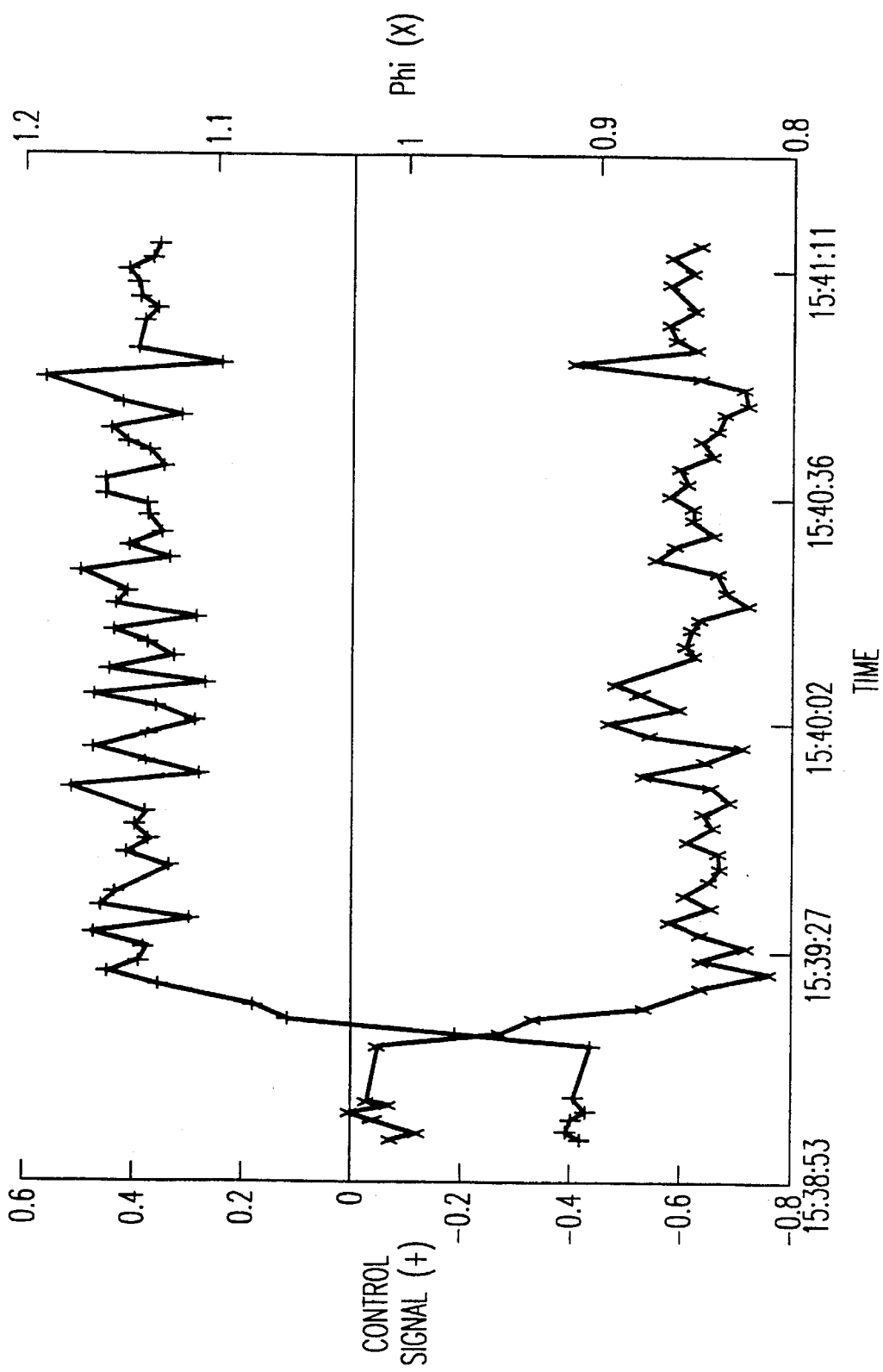

As shown in FIG. 5, the slope of the curve formed by the ratio of CO to $CO_2$ is generally negative as the stoichiometry value ($\phi$) increases from 0.85 to 1.30. On the other hand, the slope of the curve formed by the ratio of $H_2O$ to CO is generally positive as the stoichiometry value ($\phi$) increases from 0.85 to 1.30. The ratio of $CO_2$ to $H_2O$, as shown in FIG. 6, remains relatively stable as the stoichiometry value ($\phi$) increases from 0.85 to 1.30. The curve formed by the average of the difference between the ratio of $CO/CO_2$ minus the ratio of $H_2O/CO$ plus or minus one standard deviation is shown in FIG. 7. The resulting curve which declines continuously from left to right as the stoichiometry value ($\phi$) increases from 0.85 to 1.30 may serve as a control curve for adjusting the air-fuel ratio to the burner. The control curve has a unique control signal value for each stoichiometry value ($\phi$). FIG. 8 is another example of a suitable control curve generated in the same fashion as the curve of FIG. 7. FIG. 9 corresponds to the control curve illustrated in FIG. 8 plus or minus a standard deviation.

Figure 14:
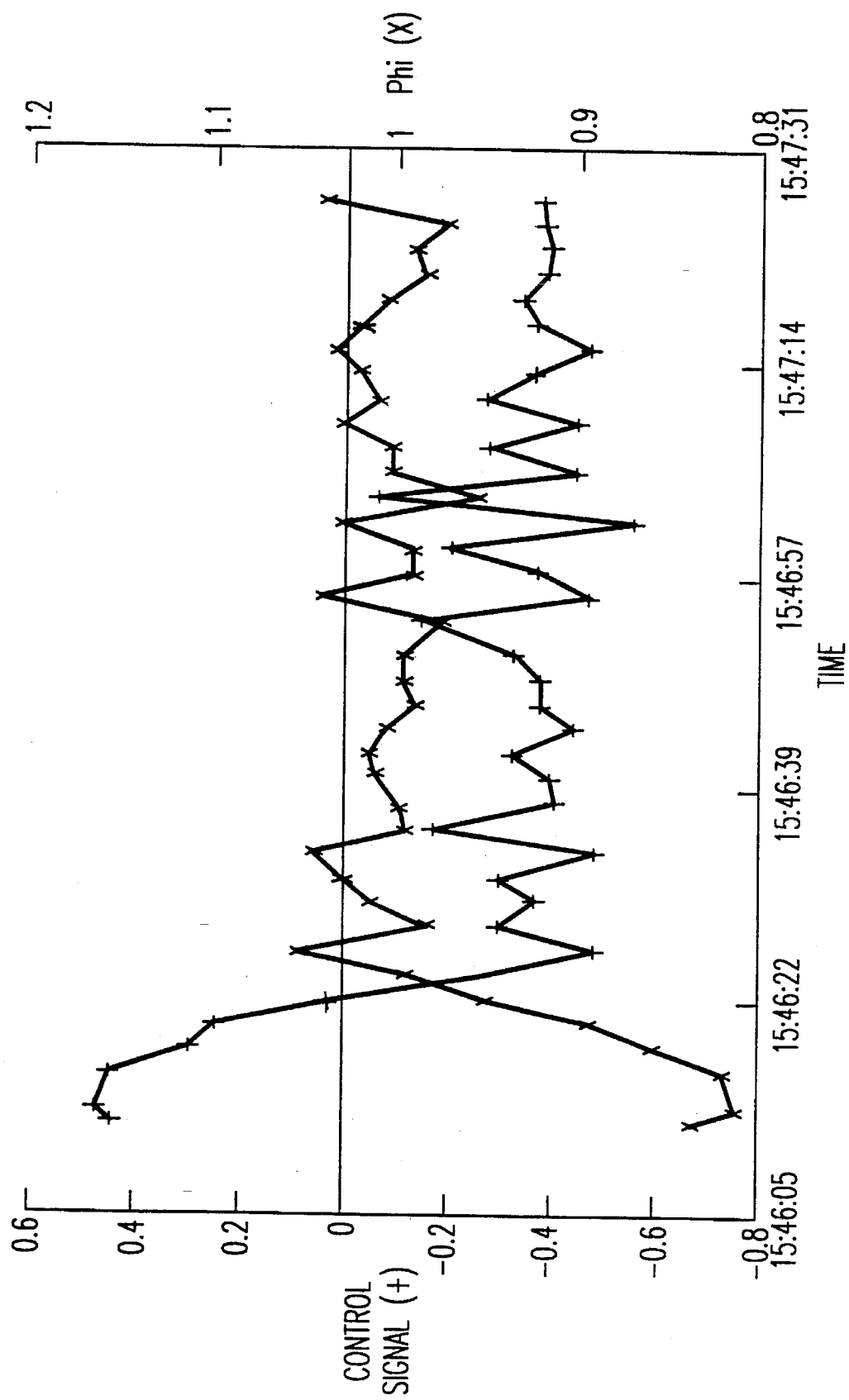

Tests were conducted using a control signal curve as illustrated in FIG. 9. A point on that curve was set in the computer as the desired operating point. As shown in FIGS. 10–14 the stoichiometry value ($\phi$) of the test facility was set manually above or below the desired set point using the fuel input flow. Control of the fuel was then transferred to the real-time combustion controller computer and a control signal was measured and compared to the target control point. If the current measured control signal value was less than the desired set point, the fuel flow was increased by signals from the computer 8 of the real-time combustion controller to effect a decrease in the air to fuel ratio. Conversely, if the measured control signal value was greater than the set point, the fuel flow was decreased. If the measured control signal was within plus or minus of one standard deviation of the control signal, no change in the fuel flow was made. The approach to the target control signal and desired stoichiometry value ($\phi$) was rapid. Fluctuations around the long-time average value were due to variations in the air and fuel flows to the burner; however, the real-time combustion controller always returned to the desired set point. FIGS. 10–13 illustrate tests where the stoichiometry value ($\phi$) was initially higher than the desired set point and the control system rapidly adjusted the stoichiometry value to the desired set point. Thereafter, the stoichiometry value fluctuated around the desired set point. FIG. 14 illustrates the opposite situation where the stoichiometry value was initially lower than the set point and the control system rapidly approached the set point and thereafter fluctuated around the set point.

Obviously, additional modifications and variations of the present invention are possible in light of the above teachings. It therefore to be understood that within the scope of the appended claims, the invention may be practiced otherwise than specifically described herein.

What is claimed as new and desired to be secured by Letters Patent of the United States is:

1. A method of regulating the air to fuel ratio supplied to a burner to maximize combustion efficiency comprising the steps of:

(a) placing optical means in close proximity to the burner but downstream thereof for directing a beam of radiation from hot gases produced by said burner toward a plurality of detectors;

(b) sensing with a first detector the intensity of the infrared radiation emitted from said hot gases in a first wavelength band to determine the concentration of a first constitutent in said hot gases;

(c) sensing with a second detector the intensity of the infrared radiation emitted from said hot gases in a second wavelength band to determine the concentration of a second constituent in said hot gases;

(d) sensing with a third detector the intensity of the infrared radiation emitted from said hot gases in a third wavelength band to determine the concentration of a third constituent in said hot gases;

(e) computing as a first ratio the intensity of the first constituent to the intensity of the second constituent and computing as a second ratio the intensity of the third constituent with respect to the first constituent;

(f) subtracting the second ratio from the first ratio;

(g) comparing the result of step (e) with a known control curve representing the differences between said first and second ratios for stoichiometry values ranging from a fuel rich value of 0.85 to a fuel lean ratio of 1.30; and (h) adjusting the fuel flow to said burner until the difference between said ratios falls on a desired set point on said control curve.

2. A system for regulating the air to fuel ratio supplied to a burner to maximize combustion efficiency comprising:

(a) optical means located in close proximity to said burner but downstream thereof for directing a beam of radiation from hot gases produced by said burner toward a plurality of detectors;

(b) a first detector for sensing the intensity of infrared radiation emitted from said hot gases in the wavelengths between 4720 nm and 5100 nm adapted to determine the concentration of CO in said hot gases;

(c) a second detector for sensing the intensity of infrared radiation emitted from said hot gases in the wavelengths of 4381 nm±180 nm adapted to determine the concentration of $CO_2$ in said hot gases;

(d) a third detector for sensing the intensity of infrared radiation emitted from said hot gases in the wavelengths of 2690 nm±50 nm adapted to determine the concentration of $H_2O$ in said hot gases;

(e) means for computing the ratio of CO to $CO_2$ and the ratio of $H_2O$ to CO;

(f) means for subtracting the ratio of $H_2O$ to CO from a ratio of CO to $CO_2$;

(g) means for comparing the results obtained from the means for subtracting with a known control curve representing the difference between the ratio of CO to $CO_2$ and $H_2O$ to CO for stoichiometry values ranging from a fuel rich value of 0.85 to a fuel less value of 1.30; and (h) means for adjusting the fuel flow to said burner on the basis of the result obtained from said means for comparing until the difference between the ratio of CO to $CO_2$ and $H_2O$ to CO falls on a desired set point on said control curve.

* * * * *